(12) United States Patent
Bokish

(10) Patent No.: US 7,269,417 B1
(45) Date of Patent: Sep. 11, 2007

(54) INFORMATION SERVICES ENHANCEMENTS

(75) Inventor: Bruce Bokish, Raleigh, NC (US)

(73) Assignee: Nortel Networks Limited, St. Laurent (CA)

(*) Notice: Subject to any disclaimer, the term of this patent is extended or adjusted under 35 U.S.C. 154(b) by 401 days.

(21) Appl. No.: 10/439,360

(22) Filed: May 16, 2003

(51) Int. Cl.
*H04Q 7/20* (2006.01)

(52) U.S. Cl. .................. 455/428; 455/422.1; 705/39

(58) Field of Classification Search ............ 455/428, 455/422.1; 705/39, 35; 345/738
See application file for complete search history.

(56) References Cited

U.S. PATENT DOCUMENTS

| | | | |
|---|---|---|---|
| 4,812,843 A | 3/1989 | Champion, III et al. .... | 340/905 |
| 5,959,621 A | 9/1999 | Nawaz et al. ............... | 345/329 |
| 6,085,101 A | 7/2000 | Jain et al. ................... | 455/500 |
| 6,216,141 B1 | 4/2001 | Straub et al. ............... | 707/513 |
| 2004/0189696 A1* | 9/2004 | Shirriff ....................... | 345/738 |
| 2005/0143064 A1* | 6/2005 | Pines et al. ................. | 455/428 |
| 2005/0192892 A1* | 9/2005 | Willard ....................... | 705/39 |

* cited by examiner

*Primary Examiner*—Jean Gelin
*Assistant Examiner*—Phuoc Doan
(74) *Attorney, Agent, or Firm*—Withrow & Terranova, PLLC (57) ABSTRACT

The present invention relates to an information services system wherein requesters can call in to the information services system, request information, and additionally, subscribe to receive updates or alerts that are pertinent to the requested information. Accordingly, a single request for information by a requestor can trigger the receipt of periodic updates and alerts without requiring subsequent requests.

36 Claims, 4 Drawing Sheets

INFORMATION SERVICES ENHANCEMENTS

FIELD OF THE INVENTION

The present invention relates to information services, and in particular to providing subsequent updates or alerts bearing on a previous information services request.

BACKGROUND OF THE INVENTION

Various types of information services are available to provide callers with all types of information, such as directory assistance information and other enhanced information services. These enhanced information services may provide, for example, information bearing on addresses, movie listings, driving directions, and location. Unfortunately, those requesting information from information services are often unable to readily make note of the information provided in response to their requests. Both landline and mobile telephony users may not have ready access to pen and paper. Further, even if the requestor has access to pen and paper, or can remember the information provided, the requestor must take additional steps to electronically store the information in the telephony device or other device associated with the requester. In many instances, it would also be beneficial to forward the information to other users in an electronic format, which also requires additional steps.

Most of the information provided by information services is subject to change from time to time, and the requestors of information would benefit from receiving updates when the information they requested changes, or when alerts bearing on the information requested are available. Although there are numerous web-based services in which subscribers can subscribe to periodic information updates, there is no way for a requestor to call into an information services system, request information, and subsequently receive updates or alerts bearing on the previously requested information in an efficient manner. Further, there is no way to receive these updates and alerts in an electronic format, which allows the requesters to efficiently use or store the provided updates and alerts.

As such, there is a need for a way to allow requesters of information services to receive subsequent updates or alerts bearing on the information request in an efficient and effective manner. There is further need for a way to provide information in response to a request to information services as well as any subsequent updates or alerts in an electronic format capable of being readily used or stored by the requestor, or upon request by the requestor, be sent to another user.

SUMMARY OF THE INVENTION

The present invention relates to an information services system wherein requestors can call in to the information services system, request information, and additionally, subscribe to receive updates or alerts that are pertinent to the requested information. Accordingly, a single request for information by a requestor can trigger the receipt of periodic updates and alerts without requiring subsequent requests.

In addition to a traditional audible presentation of the requested information to the user, the information and any subsequent updates and alerts can be sent in an electronic format to the telephony device used to make the request or to another device or via a call to an identified telephony device of the requestor or a third party. Thus, the requested information, along with any updates or alerts, is received by the telephony device or other device and made readily available for use, processing, or storage. The information, updates, and alerts can be sent to a device associated with the requestor, or to a device of a third party. Furthermore, the information may be sent to any of these devices directly or indirectly through a message delivery service, which is capable of receiving an electronic message containing the requested information from the information services system and generating another message using a different messaging technology to deliver the message to the ultimate destination.

The information, updates, or alerts provided by the information services system may take virtually any form, including classical directory assistance information, as well as enhanced services information, including but not limited to location information, v-cards, driving directions, calendar information, reservations, sports scores, stock prices, weather reports, or movie listings. The information services system may be automated, human-assisted, or a combination thereof to effectively generate queries to obtain the requested information and effect delivery of the requested information via an electronic message to the end device. Further, the information services system will be able to subscribe requestors to receive associated updates and alerts, detect changes in the information or related events, and provide the corresponding updates and alerts to the requester or third party. The information services system, either automatically or via a human operator, may interact with the requestor to provide further information on where and how to send the information, updates, or alerts in an electronic or audible format. Preferably, the information services system will use available information to automatically fill in fields to increase the efficiency of operations; however, interaction with the requestor may require these automatically filled fields to be modified on a request-by-request basis.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides an information services system capable of providing information services in a traditional fashion, as well as allowing the requestor to subscribe to a service, which provides subsequent updates or alerts bearing on the initially requested information. In one embodiment, the initially requested information and any subsequent updates or alerts may be sent in an electronic message directly or indirectly to a device associated with the requestor or a third party. When the electronic message is sent to a device associated with the requester, the device may be the actual telephony device used to access the operator system and facilitate the request of the information, or it may be another device, which may be another telephony device, computer, personal digital assistant (PDA), pager, or any other device capable of receiving the requested information, updates, or alerts via an electronic message. For a communication device that is not associated with the requestor, the device may take on one of the same forms previously described for the requester. Alternatively, the updates or alerts may be audibly provided to the requestor or a third party upon initiating a call to the requestor or the third party. Those skilled in the art will recognize other types and forms of communication devices associated with the requestor or third party.

As noted, the information, updates, or alerts may be sent audibly via the requestor's telephony terminal as well as directly or indirectly from the information services system in a manner effecting delivery to a device associated with the requester or third party. The information services system may format the electronic message for direct delivery to the device, wherein the electronic message is simply routed through normal communication channels and devices to the desired device. As such, the electronic message needs little or no formatting and is delivered using a single messaging technology. For example, the electronic message may be an email or instant message addressed and sent to an address associated with the device. The email will be routed through various networks, which may include routers, gateways, and email servers, until delivered to the device in an email format. Similarly, the electronic message may be transmitted using a short messaging service (SMS) or similar mechanism used in wireless communication environments, for message delivery to a mobile telephone.

Alternatively, the information services system may send the electronic message to a message delivery service, which will essentially take the information from the electronic message, create a new message, and deliver the new message to the requestor's or third party's device using a different communication technology. For example, the electronic message from the information services system may be delivered to the message delivery service using a proprietary messaging protocol, wherein the message delivery service creates an email or SMS message for delivery to the requestor's device or third party device. Another example would be where the electronic message is an email message sent from the information services system to the message delivery service, which would then pull the requested information, update, or alert from the email, preferably along with a telephone number or address for the device, and create an SMS message with the requested information, sending the SMS message to the device using the telephone number or address in traditional fashion.

Notably, the information, updates, or alerts provided by the information services system may be virtually any type of information capable of being provided by information services. In a classical directory services environment, the information, updates, or alerts will typically include a telephone number, and perhaps an address associated with the telephone number. In an enhanced information services environment, the information, updates, or alerts may include any type of content associated with a listing, including information provided by the listed entity. In this example, the initial information could be a directory number and address, and a subsequent update would be triggered upon a change in the number or address and would include the new number or address.

Figure 1:
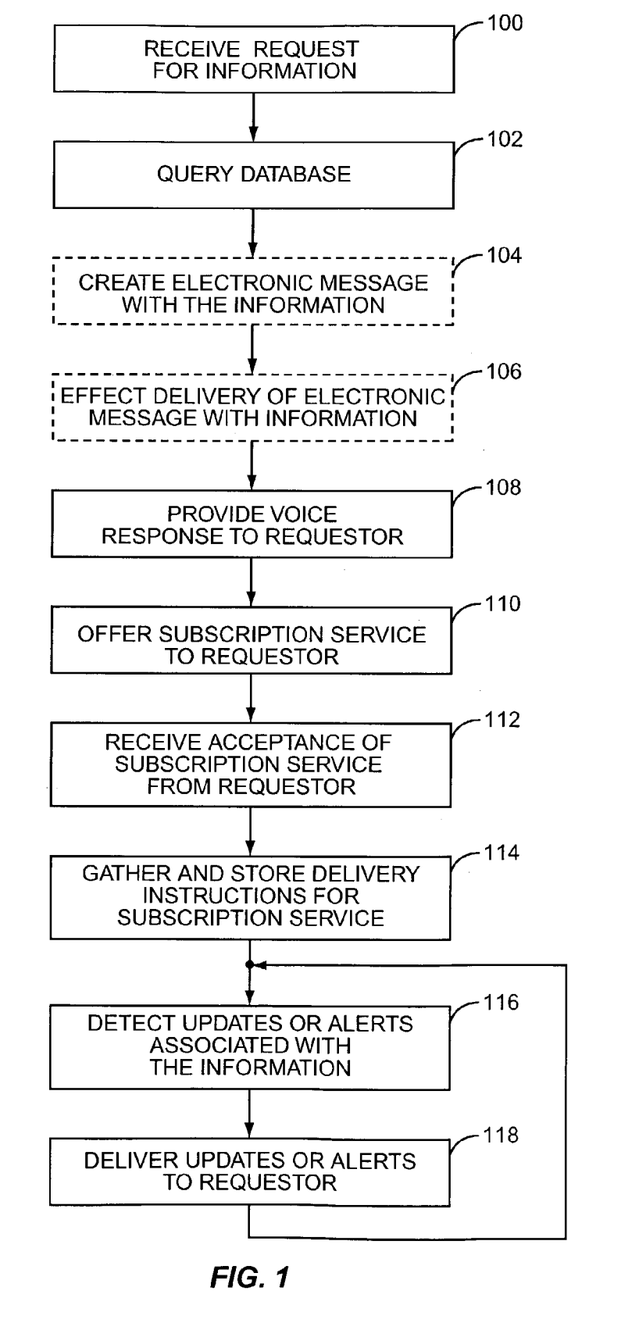
FIG. 1 is a flow diagram outlining operation of one embodiment of the present invention.

With reference to FIG. 1, a high level flow diagram is provided to outline the basic operation of the present invention according to one embodiment. Initially, an information services center will handle a call wherein it will receive a request for information from a requester (step 100). The information services system will query a database or other serving entity in an effort to identify information responsive to the request (step 102). In one embodiment, responses to the request may be provided audibly to the requestor, via an electronic message sent to a requestor's or third party's device, or both. If an electronic message containing the information is desired, the information services system will create an electronic message with the information responsive to the request (step 104) and effect delivery of the electronic message to the requestor or third party device (step 106). Additional information for delivering such electronic messages is described further in the specification.

The information services system may also provide a voice or audible response to the requestor during the call (step 108). At some point during the voice response, the information services system may offer a subscription service to the requestor (step 110), wherein the subscription service functions to provide updates or alerts, which are associated with the requested information. Accordingly, when the information changes, an update will be provided to the requester, or the third party as the case may be. Similarly, alerts other than those bearing on the requested information may be provided to the requestor. Examples of types of updates and alerts and the various kinds of information provided to the requestor are described below in further detail.

When the information services system receives an acceptance of the subscription service from the requestor (step 112), the information services system will gather and store delivery instructions, if necessary, for the subscription service (step 114). At this point, the information services system will take the necessary monitoring steps to enable it to detect when updates and alerts associated with the information should be provided to the requester or a third party device (step 116), and will then take the necessary steps to deliver the updates or alerts to the requestor or a third party via electronic messaging or initiating a call in which an audible message provides the update or alert (step 118).

Notably, subscribers can set up a profile with the information provider providing the alerts or updates. In the profile, the subscriber can enter her (or a third party's) telephone numbers, text messaging addresses, email addresses and the like, as well as specify a preferred method for providing the updates and alerts. The profile may be set up ahead of time such that if and when the customer requests information and wants to be updated, she does not have to enter profile information at the time the information request is made, in an effort to expedite the process.

Figure 2:
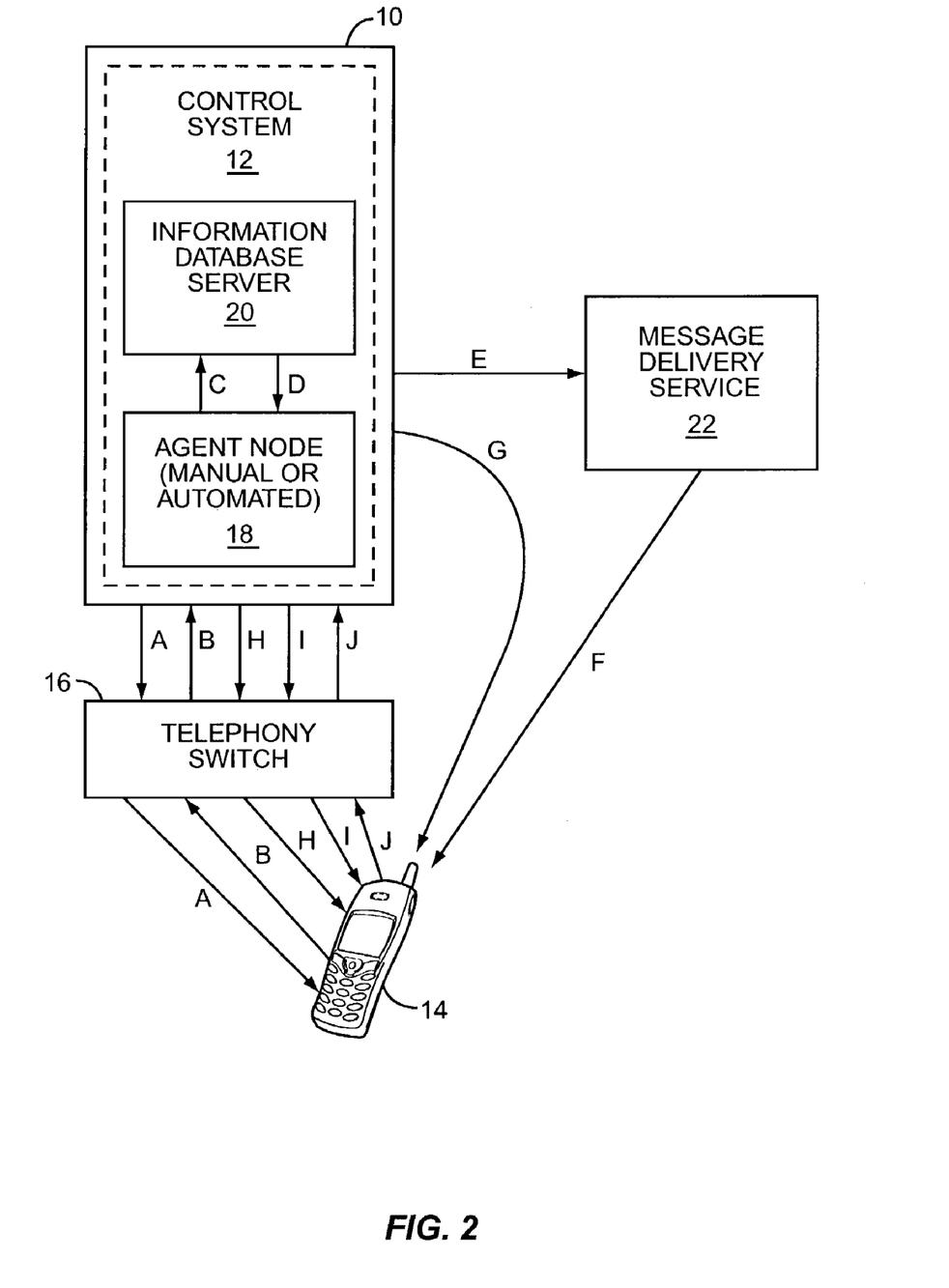
FIG. 2 is a block representation of a first embodiment of the present invention showing an exemplary process flow.
Figure 3:
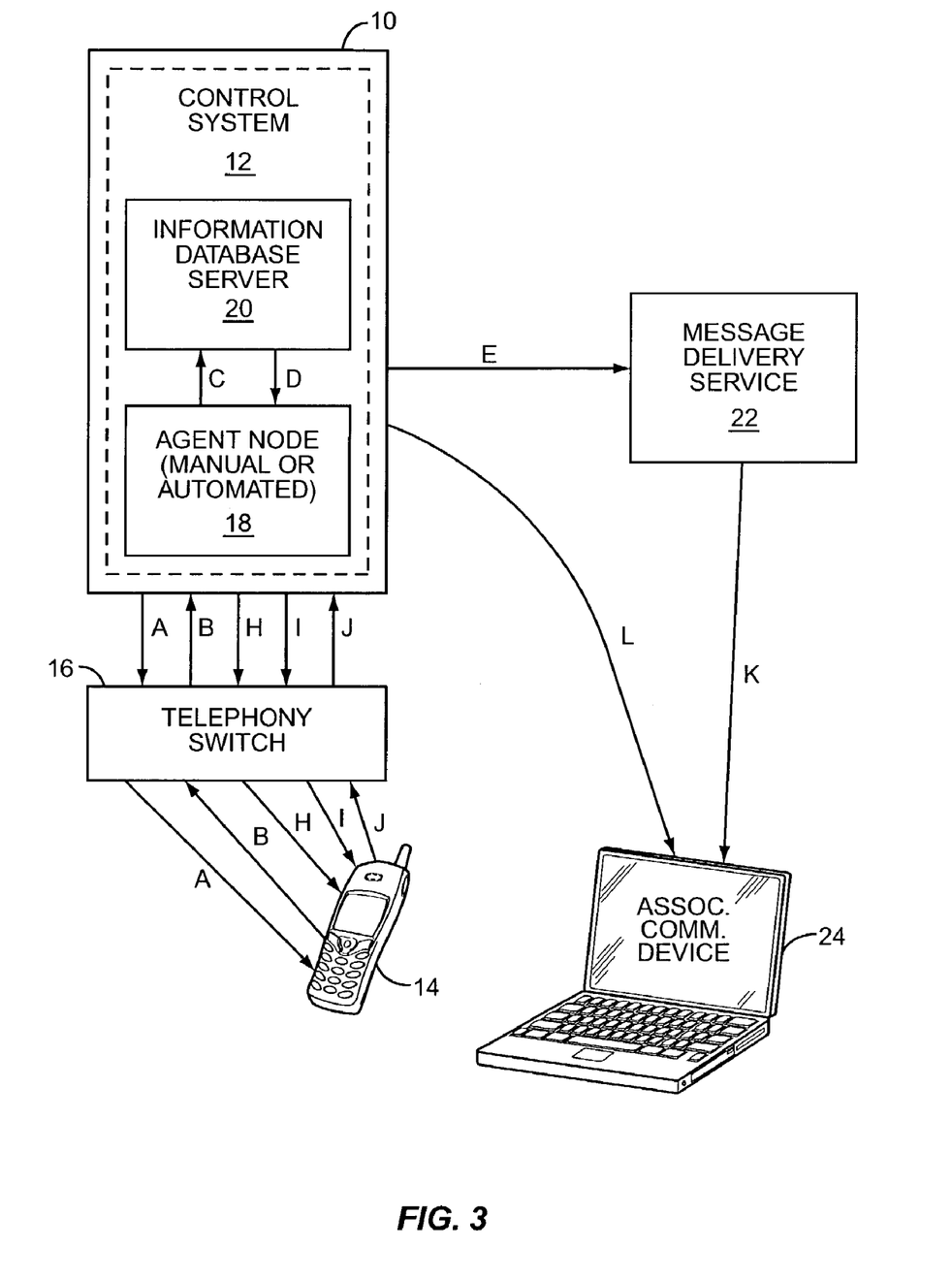
FIG. 3 is a block representation of a second embodiment of the present invention showing an exemplary process flow.
Figure 4:
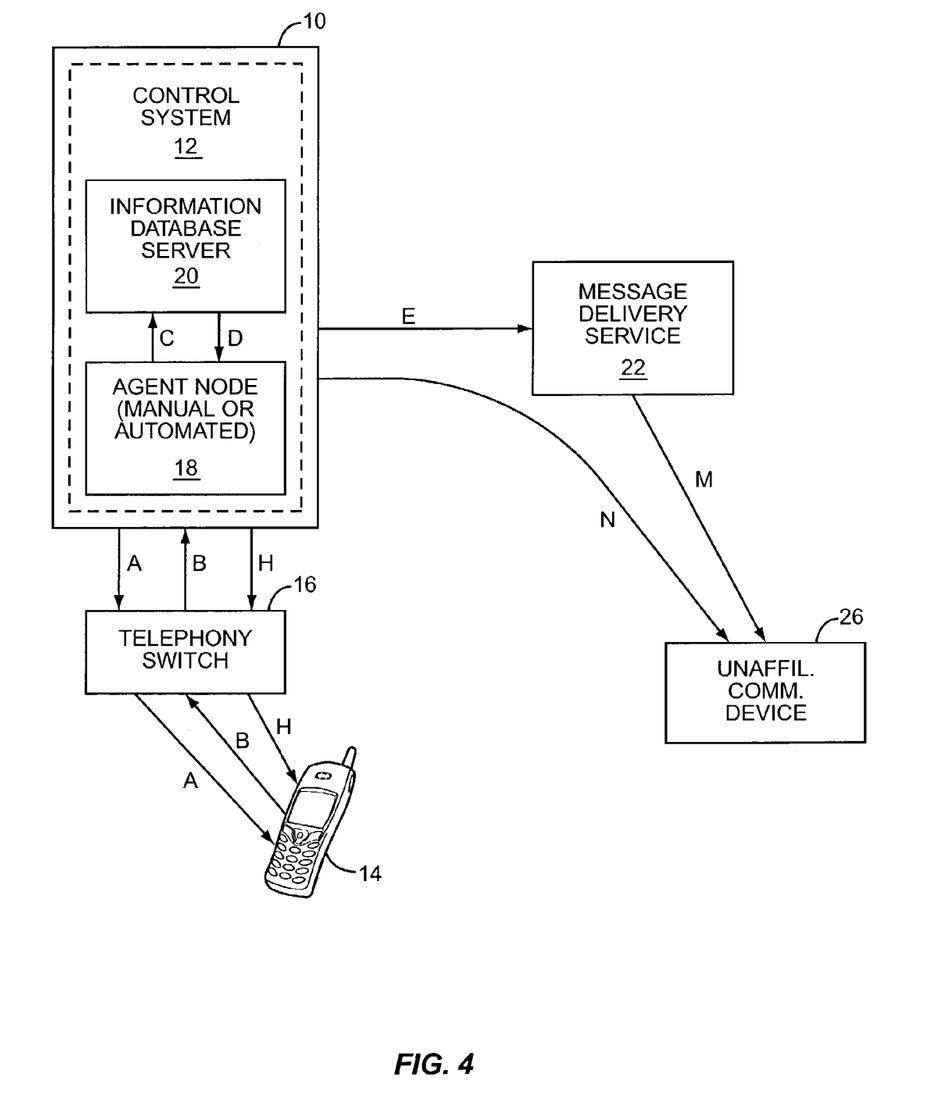
FIG. 4 is a block representation of a third embodiment of the present invention showing an exemplary process flow.

Exemplary communications environments 10 are illustrated in FIGS. 2-4, which depict high-level architectures for providing information services according to different aspects of the present invention. With particular reference to FIG. 2, an information services system 10 includes a control system 12 and any necessary communication interfaces, and is capable of receiving an information services request from a requestor's telephony device 14 via a telephony switch 16, which facilitates circuit-switched or packet-switched communications between the information services system 10 and the requestor's telephony device 14. The information services system 10 will typically include an agent node 18, which provides a voice-based interface with the telephony device 14 through the telephony switch 16 or analogous operator services system provided by servers, or like application nodes. The agent node 18 may be manual, automated, or a combination thereof and is used to facilitate an interactive voice session with the requester. Further, the agent node 18 may be provided by the control system 12 or other system. In a manual mode, the information services system 10 will effectively connect a voice session with a human agent, who will listen to the requestor's request and take the necessary action(s) to obtain information in response to the request, as well as effect delivery of the information via a voice session back to the requestor through the telephony switch 16 and telephony device 14. Alternatively with this invention, instead of the voice response, the requested information may be packaged in an electronic message, which is delivered directly or indirectly to the telephony device 14 or other device, as will be described below in further detail. Subsequent updates or alerts may be provided by calling the requestor or via an electronic message.

In an automated mode, the information services system 10 will provide a fully automated interactive voice response system, which can provide an automated introductory message to elicit a request from the requester, recognize a voice-based or tone-based response from the requester, access the requested information, and effect delivery of the information via the voice session, as well as via an electronic message intended for delivery to the telephony device 14 or other device. Additionally, the information services system 10 may operate in an automated session unless human assistance is required, and at that point a human agent can intervene as necessary to interpret the request, recover information in response to the request, and effect delivery of a voice response, an electronic message, or a combination thereof.

Typically, an information database server 20 is accessible by the agent node 18 and stores information that is requested by the requestor. The information database server 20 may be fully integrated or implemented over multiple devices to provide a decentralized architecture. In any event, the agent node 18 will either access the information database server 20 to obtain information responsive to the requestor's request, or provide instructions to the information database server 20 to identify information based on select criteria and effect delivery of the information as well as subsequent updates via a voice session or by an electronic message. As such, actual electronic messages may be created and sent from the information services system 10 via the information database server 20 or the agent node 18, depending on the particular configuration of the information services system 10 and information database server 20. Those skilled in the art will recognize the different ways to implement the concepts of the present invention among the various devices making up an information services system 10. For example, the information services system 10 may be an operator or directory services system where the agent is an operator and the agent node 18 is an operator work station.

A basic call flow is also provided in FIG. 2, wherein each step is referenced with a letter. In this example, assume the requestor dials a number, such as 411, to request information services. As such, the telephony switch 16 will act alone or in conjunction with other switches, routers, or the like, to establish a voice connection between the telephony device 14 and the information services system 10, via the agent node 18. Once connected, and upon receiving an automated or human greeting asking the requester for a request (step A), the requestor will speak or provide an electronic response, such as by pressing certain keys, to the agent node 18 (step B). In this embodiment, the information database server 20 is accessible by the agent node 18 to provide information based on search queries provided by the agent node 18. As such, the agent node 18 will generate and send a query with search criteria for the requested information to the information database server 20 (step C), which will use the search criteria to identify the requested information and send the requested information back to the agent node 18 (step D).

During this time, the agent node 18, manually or via human assistance, may interact with the requester to obtain various types of information, such as whether or not the requestor would like to have the information delivered to the telephony device 14 or other device associated with the requestor or a third party. In this example, assume that the requester indicated a desire to have the information sent to the telephony device 14 in an electronic format as well as via the voice session in a traditional fashion. As such, the information services system 10 under the control of the agent node 18, information database server 20, or a combination thereof, will create an electronic message for delivery to the telephony device 14 based on information available in the information database server 20, supplied by telephony switch 16, or provided by the requester. Further, if the telephony device 14 can receive the message in multiple formats via different communication technologies, that formatting information may be provided by the information database server 20, the telephony switch 16, or the requester, and will be used to determine how to create and format the message and to determine the address to which to send an electronic message, which will be either sent indirectly to the telephony device 14 via a message delivery service 22, or directly to the telephony device 14.

If the message delivery service 22 is used, the electronic message is formatted in a manner that is capable of being processed by the message delivery service 22 and sent directly to the telephony device 14 from the message delivery service 22. As such, the message delivery service 22 provides a conversion of the electronic message sent from the information services system 10 from one communication technology (or protocol) to another. Thus, an electronic message is sent from the information services system 10 using a first technology (step E), and the information therein is then used to create a second electronic message via a different technology and sent to the telephony device 14 (step F). Alternatively, the electronic message may be formatted such that it is capable of being received and processed by the telephony device 14, and thus sent directly to the telephony device 14 (step G).

In either the direct or indirect delivery methods, the messages may take any type of messaging format, including email, SMS, instant messaging (IM), paging, or other available way to send an electronic message that is capable of being read by the telephony device 14. The information services system 10 may optionally provide the information in an audible format over the voice session to the requester via the telephony switch 16 and the telephony device 14 (step H).

At some point during this process, the information services system 10 can query the requestor to determine if a subscription to updates or alerts is desired, if there are changes in the information provided for events related to the information provided (step I). The requestor can respond during the call to accept the subscription (step J), which will cause the information services system 10 to monitor for changes in the information provided or events that may impact the information provided. During this exchange, the requestor can select the way in which the updates or alerts can be provided to the telephony device 14 either directly or indirectly through the message delivery service 22. Further, the information services system 10 may be configured to initiate a call to the telephony device 14 through the telephony switch 16 to provide any necessary updates or alerts. Thus, in addition to initiating a call to the telephony device 14 upon determining the need to provide an update or alert to the requestor, electronic messages may be sent to the telephony device as described in steps E, F, and G.

As indicated above, the electronic message for the initial information or any subsequent updates or alerts provided by the information services system 10 need not be directed only to the telephony device 14, but may be directed to another communication device 24 associated with the requestor, as illustrated in FIG. 3. Notably, the electronic message may be sent to any real device or virtual entity, as will be appreciated by those skilled in the art. Thus, the initial request, information queries, and acceptance of a subscription to receive updates and alerts may take place as above, but when electronic messages are created, information provided by the information database server 20, the telephony switch 16, or the requestor may be used to identify the final destination of the electronic messages. Thus, for indirect delivery invoking the message delivery service 22 to provide a conversion from a first messaging technology to another, an electronic message is first sent to the message delivery service 22 (step E), and then reformatted as necessary and sent to the associated communication device 24 (step K). Alternatively, the electronic message may be sent directly to the associated communication device 24 (step L) without need for a transfer between messaging technologies.

In yet another embodiment as illustrated in FIG. 4, the electronic messages may be directly or indirectly delivered to a communication device 26 that is unaffiliated with the requestor, based on instructions from the requester via the agent node 18. Thus, the requested information, update, or alert may be used to create an electronic message, which is sent to the message delivery service 22 using a first messaging technique (step E), wherein the message delivery service 22 will format the information in a second electronic message according to a second messaging technology and send the second electronic message to the unaffiliated communication device 26 (step M). Again, the electronic message may be configured to be sent directly to the unaffiliated communication device 26 (step N).

Notably, electronic messages that are processed by the message delivery service 22 before being delivered to the telephony device 14, associated communication device 24, or unaffiliated communication device 26 are addressed to the message delivery service 22, and will include as part of the information an address or telephone number associated with the respective device for the message delivery service 22 to use when determining where to ultimately send the information. Furthermore, information bearing on the type of message or messaging technology to be used when sending the message to the ultimate device may also be provided. When sending the information, updates, or alerts directly to the telephony device 14, associated communication device 24, or unaffiliated communication device 26, the telephone number or address of the actual device is used, such that the pertinent communication network can simply route the electronic message to the device in traditional fashion.

Once in possession of the delivery information, the telephony device 14, associated communication device 24, or unaffiliated communication device 26 can store, process, or otherwise use the information, updates, or alerts in any desired fashion. Importantly, the requested information, updates, or alerts may be provided to these devices in an electronic format that can be readily stored, processed, or otherwise used by an application, instead of having the requestor remember the information and subsequently try to enter it into the device for storage or use. Accordingly, this information can be readily retrieved at a later date or used in an application on the telephony device 14, associated communication device 24, or unaffiliated communication device 26.

One particularly useful type of information that information services system 10 may be configured to provide is an electronic business card or v-card, which is a set of information typically including name, business, address, telephone numbers, web sites, and email addresses associated with a particular party or entity in a format readily accepted by a contact management application. As such, a requestor may request information in some manner regarding a particular individual, and the information that is provided to the telephony device 14, associated communication device 24, or unaffiliated communication device 26 is the v-card, which is presented to these devices in a format that can be readily stored in the contact management application running on the device. Similarly, scheduling or calendar information may be provided. For example, the information may be an appointment or reservation for downloading into a scheduling or calendar program, such as Microsoft Outlook. The information is provided in a format readily usable by the particular device to further minimize the steps necessary for the user or third party to effectively store and use the provided information.

If the initially requested information is contact information such as an address or telephone number, when the information services system 10 detects a change in the address or telephone number, it can initiate delivery of an update providing the new address, telephone number, or both. If the information is an appointment or a reservation, an update may be provided to the requestor indicating the change in the appointment or reservation, and preferably providing this information in a format that is readily used by the scheduling or calendar program to automatically incorporate the change in the requestor's schedule or calendar.

In summary, the present invention allows a requester to subscribe to services providing updates and alerts bearing on the information they initially requested. When the information requested changes, an update can be sent to the requestor or a third party in a variety of ways. Similarly, if events occur relating to the information initially requested, alerts can be provided to the requestor or a third party. Further, the initial and any subsequent responses may be sent in an electronic format that is readily acceptable by the device and recognized by applications running thereon. The information, updates, and alerts can be provided through calls back to the requestor or third party, via email or instant messaging, or via a text service, such as the short messaging service in a wireless environment. The type of information provided may relate to directory assistance, movie listings, sports scores, weather, pricing of goods and services, stock quotes, traffic reports, and the like.

When any of the information changes, such as when a stock price drops below a certain threshold, a score changes, a storm warning occurs, or a traffic delay is reported, an update or alert can be provided to the requester in an automated fashion without requiring the requester to initiate an information services inquiry a second time. Preferably, the subscription to such services occurs during the initial information request. Notably, subsequent updates and alerts do not have to be provided to the requester or a third party in the same way in which the initial information is provided. During the subscription process, the information services system 10 can gather any necessary information for fulfilling the service and sending the updates and alerts via an electronic message or calling the requester or third party using a defined directory number.

Those skilled in the art will recognize improvements and modifications to the preferred embodiments of the present invention. All such improvements and modifications are considered within the scope of the concepts disclosed herein and the claims that follow.

What is claimed is:

1. A method for providing information services comprising:
   a) receiving a request from a requester via a voice session;
   b) accessing information responsive to the request;
   c) delivering the information to the requester;
   d) detecting a change to the information or an event bearing on the information after delivering the information; and
   e) delivering subsequent information to the requester upon detecting the change or the event, the subsequent information including an update indicative of the change of the information or an alert regarding the event bearing on the information, wherein delivering the subsequent information further comprises:
      creating an electronic message including the subsequent information; and
      effecting delivery of the electronic message in a manner causing the subsequent information to be received by a communication device in an electronic format wherein the subsequent information is delivered outside of the voice session, wherein delivery of the electronic message is effected by sending the electronic message to a first address of a message delivery service, which is adapted to receive the electronic message, retrieve the subsequent information, create a second message, and send the second message to a second address associated with the communication device.

2. The method of claim 1 further comprising receiving another request from the requester to receive the subsequent information.

3. The method of claim 2 wherein the another request is received during the voice session.

4. The method of claim 2 further comprising offering to provide the subsequent information to the requester when the subsequent information becomes available, wherein the offering precedes receiving the another request.

5. The method of claim 1 wherein delivering the subsequent information further comprises calling a telephony device associated with the requester to establish a second voice session and audibly providing the subsequent information to the requester via the second voice session.

6. The method of claim 1 wherein delivery of the electronic message is effected by sending the electronic message to an address for the communication device.

7. The method of claim 6 wherein the communication device is associated with the requester.

8. The method of claim 6 wherein the communication device facilitated the voice session.

9. The method of claim 6 wherein the communication device is unaffiliated with the requester.

10. The method of claim 1 wherein the communication device is associated with the requester.

11. The method of claim 1 wherein the communication device participates in the voice session.

12. The method of claim 1 wherein the communication device is unaffiliated with the requester.

13. The method of claim 1 further comprising receiving instruction from the requester during the voice session identifying how to effect delivery of the subsequent information to the requester.

14. The method of claim 1 further comprising providing an audible response to convey the information to the user via the voice session.

15. The method of claim 1 wherein the subsequent information is formatted in a manner in which it is readily acceptable by an application provided on a device receiving the subsequent information.

16. The method of claim 1 wherein the subsequent information is delivered via at least one of a group consisting of email, instant messaging, text messaging, and short messaging service.

17. The method of claim 1 wherein the requester requests information services where the information services are directory assistance services and the information and subsequent information are related to telephony information for telephony subscribers.

18. The method of claim 17 wherein the subsequent information is related to a party identified in the request and includes at least one of a group consisting of:
   a) a directory number associated with a requested party;
   b) an address associated with the requested party;
   c) an electronic business card for the requested party;
   d) a location associated with the requested party; and
   e) driving directions to the requested party.

19. An information services system for providing information services comprising a control system associated with at least one communication interface and adapted to:
   a) receive a request from a requester via a voice session;
   b) access information responsive to the request;
   c) deliver the information to the requester;
   d) detect a change to the information or an event bearing on the information after delivering the information; and
   e) deliver subsequent information to the requester upon detecting the change or the event, the subsequent information including an update indicative of the change of the information or an alert regarding the event bearing on the information, wherein to effect delivery of the subsequent information, the control system is further adapted to:
      create an electronic message including the subsequent information; and
      effect delivery of the electronic message in a manner causing the subsequent information to be received by a communication device in an electronic format wherein the subsequent information is delivered outside of the voice session, wherein to effect delivery of the electronic message, the control system is further adapted to send the electronic message to a first address of a message delivery service, which is adapted to receive the electronic message, retrieve the subsequent information, create a second message, and send the second message to a second address associated with the communication device.

20. The information services system of claim 19 wherein the control system is further adapted to receive another request from the requestor to receive the subsequent information.

21. The information services system of claim 20 wherein the another request is received during the voice session.

22. The information services system of claim 20 wherein the control system is further adapted to offer to provide the subsequent information to the requestor when the subsequent information becomes available, wherein the offer precedes receiving the another request.

23. The information services system of claim 19 wherein to deliver the subsequent information, the control system is further adapted to call a telephony device associated with the requestor to establish a second voice session and audibly provide the subsequent information to the requester via the second voice session.

24. The information services system of claim 19 wherein to effect delivery of the electronic message the control system is further adapted to send the electronic message to an address for the communication device.

25. The information services system of claim 24 wherein the communication device is associated with the requester.

26. The information services system of claim 24 wherein the communication device facilitated the voice session.

27. The information services system of claim 24 wherein the communication device is unaffiliated with the requestor.

28. The information services system of claim 19 wherein the communication device is associated with the requester.

29. The information services system of claim 19 wherein the communication device participated in the voice session.

30. The information services system of claim 19 wherein the communication device is unaffiliated with the requestor.

31. The information services system of claim 19 wherein the control system is further adapted to receive instruction from the requestor during the voice session identifying how to effect delivery of the subsequent information to the requester.

32. The information services system of claim 19 wherein the control system is further adapted to provide an audible response to convey the information to the requestor via the voice session.

33. The information services system of claim 19 wherein the subsequent information is formatted in a manner in which it is readily acceptable by an application provided on a device receiving the subsequent information.

34. The information services system of claim 19 wherein the subsequent information is delivered via at least one of a group consisting of email, instant messaging, text messaging, and short messaging service.

35. The information services system of claim 19 wherein the information services are directory assistance services and the information and subsequent information are related to telephony information for telephony subscribers.

36. The information services system of claim 35 wherein the subsequent information is related to a party identified in the request and includes at least one of a group consisting of:
   a) a directory number associated with a requested party;
   b) an address associated with the requested party;
   c) an electronic business card for the requested party;
   d) a location associated with the requested party; and
   e) driving directions to the requested party.

\* \* \* \* \*